June 7, 1927.  H. C. CHASE  1,631,470
VEHICLE BRAKE
Original Filed March 22, 1926
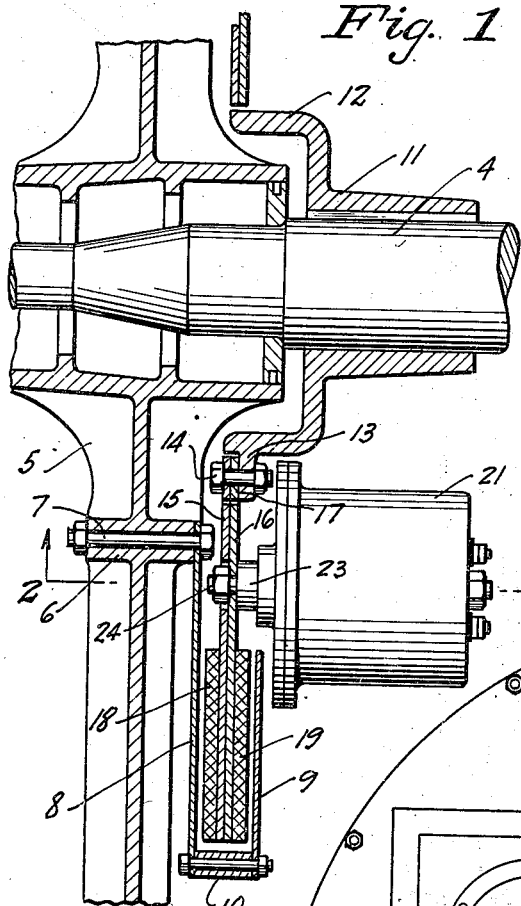
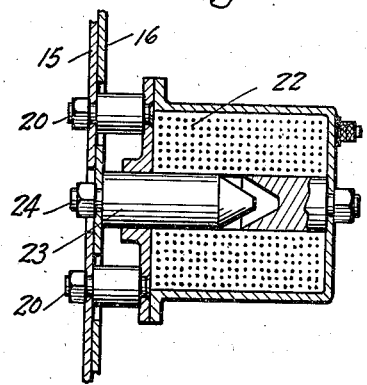
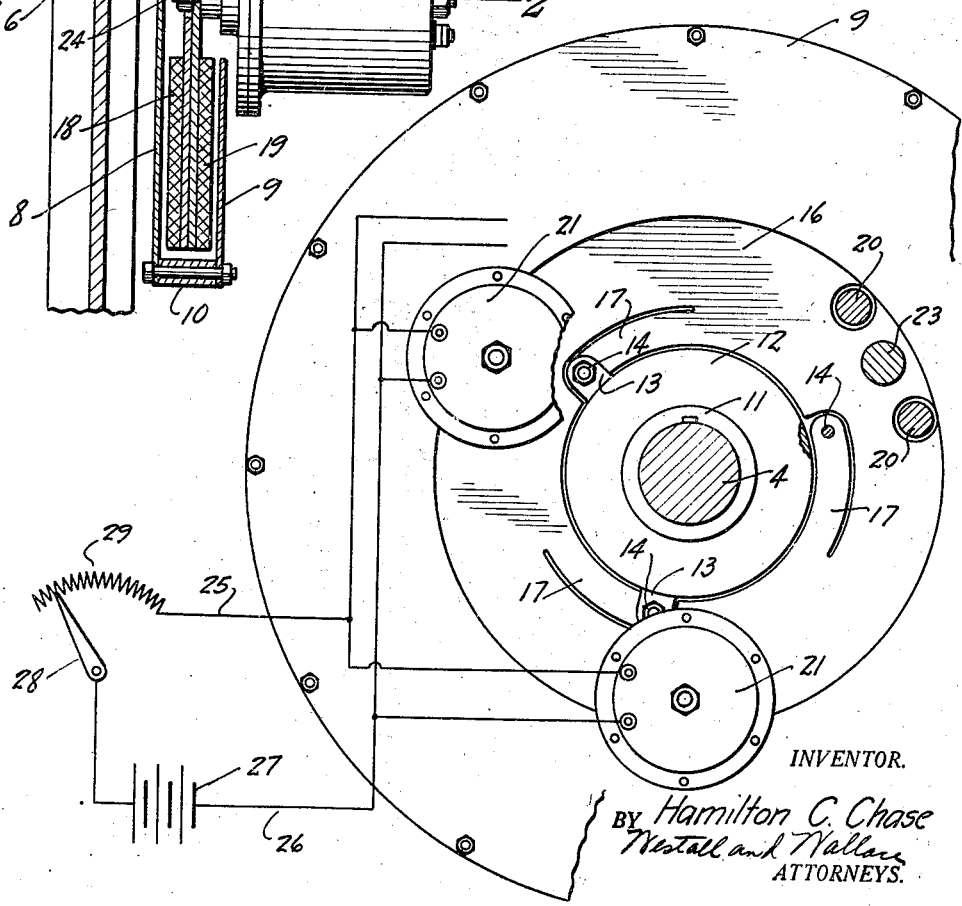
INVENTOR.
BY Hamilton C. Chase
Nestall and Wallace
ATTORNEYS.

Patented June 7, 1927.

1,631,470

UNITED STATES PATENT OFFICE.

HAMILTON C. CHASE, OF LOS ANGELES, CALIFORNIA, ASSIGNOR OF ONE-HALF TO TOBIAS WEBER, OF LOS ANGELES, CALIFORNIA.

VEHICLE BRAKE.

Application filed March 22, 1926, Serial No. 96,501. Renewed April 9, 1927.

This invention relates to a vehicle brake which employs disks adapted to be moved into frictional engagement with one another. It is the primary object of this invention to provide a brake of the character described which is compact, has a maximum of braking surface and a corresponding amount of cooling surface. Another object of this invention is to provide a brake which is especially adaptable to heavy vehicles of large load carrying capacity. A further object of this invention is to provide a brake adaptable for use upon a trailer and so arranged that it may be easily operable from the tractor or leading vehicle. A still further object of this invention is to provide a brake of the disk type having an expansible disk adapted to be crowded between adjacent disks.

These objects together with other objects and corresponding accomplishments are obtained by means of the embodiment of my invention illustrated in the accompanying drawing, in which:

Fig. 1 is an axial section through a fragment of an axle and a wheel with my improved brake mounted thereon; Fig. 2 is a section through the electro-mechanical motor as seen on the line 2—2 of Fig. 1; and Fig. 3 is an elevation of the brake as seen looking from the inside of the wheel, a wiring diagram of an electrical circuit for controlling the motors being indicated.

Referring more particularly to the drawing, 4 indicates a wheel axle which is stationary and has journalled thereon a wheel 5. The wheel and axle are of a well known type and formed on the wheel are bosses 6 which are bored to receive bolts. Secured to the wheel by means of bolts 7 extending through the bores of the bosses is a plate or disk 8 preferably formed of sheet metal. Secured to the plate 8 and spaced therefrom by means of spacer bushings 10 and bolts is a ring or disk 9. In this manner a disk member is provided which is secured to the wheel and must rotate therewith. The plates 8 and 9 form a channel therebetween to receive a working disk member.

Keyed to the shaft 4 is a sleeve 11 having a bell end 12 clearing the hub of the wheel. At the edge of the bell are lugs 13 having bolt holes for receiving bolts 14. The bolts secure plates 15 and 16 to the sleeve. The plates are of ring form and at the inner edge of plate 16, fingers 17 are provided by cutting the metal. The bolts 14 are passed through the ends of the spring fingers and thereby plate 16 is secured to the sleeve by a resilient mounting which allows a limited lateral movement. Plates 15 and 16 are mounted side by side and extend between plates 8 and 9. An expansible working disk member is thus provided, the plates of which may be spread apart and crowded into engagement with the plates 8 and 9. The plates 15 and 16 are faced with brake linings 18 and 19 to take care of wear. To operate the brakes, plates 15 and 16 are spread apart so that the brake linings 18 and 19 are moved in engagement with plates 8 and 9 and this spreading is produced with a force commensurate with the braking effect desired. I have disclosed a convenient electro-mechanical means for spreading or expanding the working disc member.

At suitable places, the plate 16 is provided with holes in registration with smaller corresponding holes to receive posts 20. The posts 20 are fixed to the plate 15 and clear the holes in plate 16 so that the latter is free to be moved. The posts serve to secure thereto a solenoid 21 having a movable plunger core 23. The core is secured to plate 16 by means of a threaded extension 24 having a nut mounted thereon, the nut extending through an opening so as to clear plate 15. In this manner the solenoid body is secured to plate 15 and the plunger to plate 16 forming a motor for operating the working disk member. Upon energization of the solenoid, the plunger is drawn into the body spreading plates 15 and 16 away from one another, and thereby expanding the working disk member so that it crowds between the plates 8 and 9 on the other disk member. The braking force exerted is dependent upon the amount of force which is exerted by the motor. In the particular construction disclosed herein, there are three spreaders or solenoid motors, one mounted adjacent each finger on plate 16. The windings of these solenoids may be connected in parallel as indicated in Fig. 3, the whole having common conductors 25 and 26. Conductor 26 is connected to a source of electrical energy herein indicated for illustrative purposes only as a battery 27. The other terminal of the battery is connected to a rheostat arm 28 moving over a variable resistance 29. Thus, the amount of energization of the solenoids and their pull may be varied. It is obvious that other means may be employed to control the force exerted by the spreaders.

What I claim is:

1. A brake comprising a rotatable element, a disk member having spaced plates, a working disk member comprising a pair of plates arranged side by side and mounted for being spread laterally so as to expand said working member and frictionally engage the plates of the other member, one of said members being secured to said element so as to be rotated therewith and the other being held against rotation, a plunger secured to one of the plates of said working member, and means for moving said plunger secured to the other plate of said working member providing a motor whereby said working member may be spread.

2. A brake comprising a rotatable element, a disk member having spaced plates, a working disk member comprising a pair of plates arranged side by side and mounted for being spread laterally so as to expand said working member and frictionally engage the plates of the other member, one of said members being secured to said element so as to be rotated therewith and the other of said members being held against rotation, a plunger core secured to one of the plates of said working member, a solenoid for said plunger securing it to the other plate of said working member, and means to energize said solenoid whereby to spread said plates.

3. A brake comprising a rotatable element, a disk member having spaced plates, a pair of plates mounted side by side to form a working member, the plates of said working member being formed of resilient metal and having spring fingers cut therefrom, means securing the spring fingers to the other plate of said working member so as to provide a resilient mounting permitting spreading of said working member, one of said members being secured to said element so as to be rotated therewith and the other member being held against rotation, and means for spreading the plates of said working member with selected pressures.

4. A brake comprising a rotatable element, a disk member having spaced plates, a pair of plates mounted side by side to form a working member, one of said pair of plates being formed of resilient metal and having spring fingers cut therefrom, means securing the spring fingers to the other plate of said pair so as to privide a resilient mounting permitting spreading of said working member, one of said members being secured to said element so as to be rotated therewith and the other member being held against rotation, a plunger secured to one of the plates of said working member, and means for moving said plunger secured to the other plate of said working member providing a motor for expanding said working member.

5. A brake comprising a rotatable element, a disk member having spaced plates, a pair of plates mounted side by side to form a working member, said plates being formed of resilient metal and having spring fingers cut therefrom, means securing the spring fingers to the other plate of said working member so as to provide a resilient mounting permitting expanding of said working member, one of said members being secured to said element so as to be rotated therewith and the other member being held against rotation, a plunger core secured to one of the plates of said working member, a solenoid for said plunger secured to the other of said plates, and means to energize said solenoid whereby to expand said plates.

In witness that I claim the foregoing I have hereunto subscribed my name this 11th day of March, 1926.

HAMILTON C. CHASE.